April 17, 1928.

R. O. BOYKIN

CAKE FORMER FOR CONTINUOUS ROTARY FILTERS

Filed March 3, 1926

INVENTOR
ROBERT O. BOYKIN
BY
ATTORNEY.

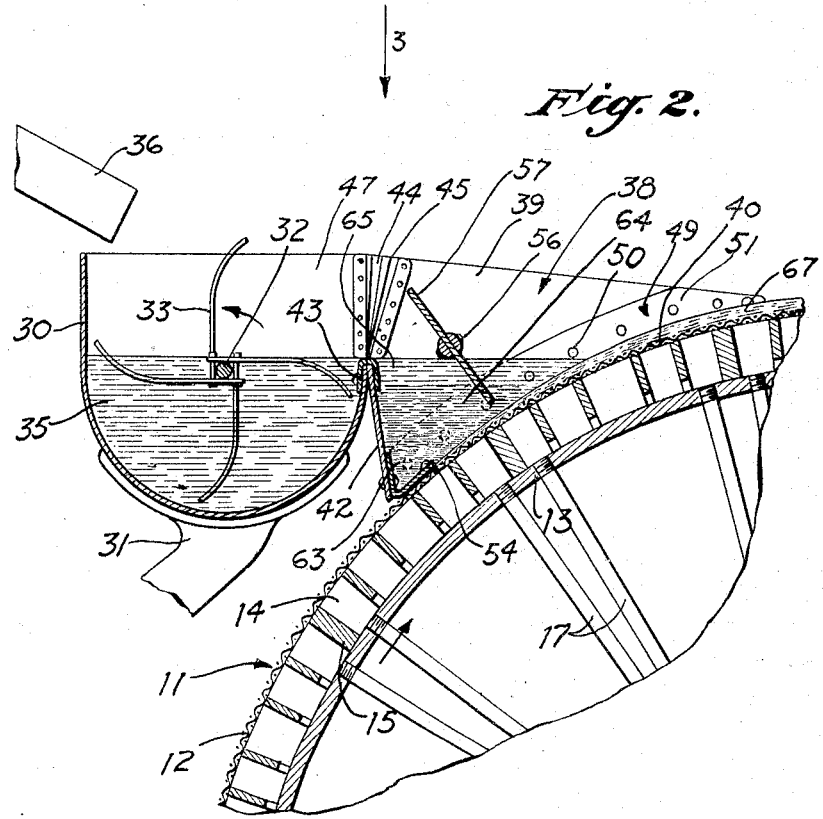
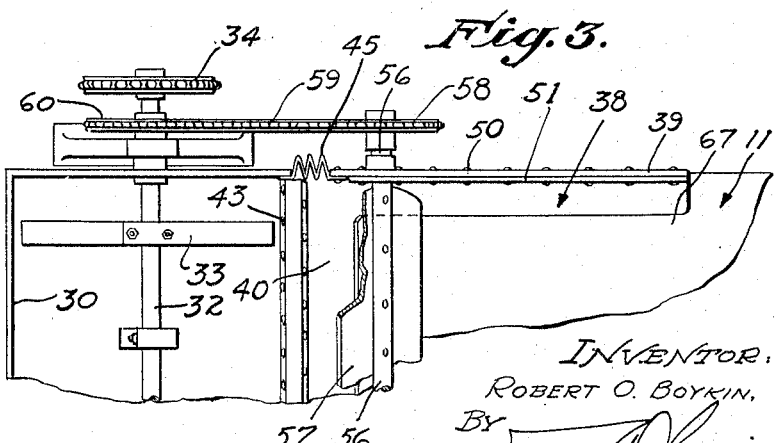

Patented Apr. 17, 1928.

1,666,279

UNITED STATES PATENT OFFICE.

ROBERT O. BOYKIN, OF LOS ANGELES, CALIFORNIA, ASSIGNOR TO N. RUSSELL VAIL, OF LOS ANGELES, CALIFORNIA.

CAKE FORMER FOR CONTINUOUS ROTARY FILTERS.

Application filed March 3, 1926. Serial No. 91,967.

My invention relates to vacuum filters and relates particularly to the applying of a coat of mixture to be filtered to the filter medium of the filter.

A common form of vacuum rotary filter consists of a rotary drum having a cylindrical filter medium. Placed below the drum is a tank in which the material or mixture to be filtered is placed, the lower part of the rotary drum being immersed in the mixture. Means is provided for creating a vacuum at the inner side of the filter medium, and as it passes through the body of mixture in the tank the mixture is caused to adhere thereto. The vacuum draws the liquid content from the solid content of the mixture, whereafter the solid content is removed from the filter medium by a scraper. Rotary vacuum filters of this character are used extensively for the extraction of oil from organic substances such as cottonseed. The cottonseed from which the oil is to be extracted is first ground and is thereafter thoroughly mixed with a suitable solvent such as benzol. This mixture of comminuted cottonseed and benzol is introduced into the tank of the rotary filter. The mixture is composed of coarse and fine particles of cottonseed suspended in the benzol. There are also quantities of finely divided colloidal matter or slime carried in the benzol. These coarse and fine particles and the colloidal matter stratify in the tank, the heavy particles moving to the bottom, the fine particles moving to a point above the coarse particles and the colloidal matter moving to the upper part of the body in the tank.

As the drum rotates and the filter medium moves into the body of mixture, it first comes into contact with the colloidal matter, which forms a layer on the outer surface of the filter medium. This layer of colloidal matter not only tends to adhere to the cloth and to resist removal therefrom, but, owing to its fine and slimy character, it tends to clog the filter material and prevents the solvent from being drawn therethrough. Also, the clogging of the filter material by the colloidal matter prevents the vacuum from acting on the heavy particles of mixture and therefore these heavy particles will not form readily into a cake on the surface of the filter drum. As the vacuum filter operates, the layer of colloidal matter directly adjacent to the filter medium gradually increases in thickness and very soon renders the filter inefficient and put it out of commission.

I have found that this present difficulty may be obviated if the heavy particles of the mixture are contacted with the filter medium before the colloidal matter has opportunity to come into contact therewith. This prevents the colloidal matter from engaging and clogging the filter medium.

It is accordingly an object of this invention to provide a method forming a cake of mixture on a filter medium so that the heavy particles of the mixture are contacted with the filter medium. I accomplish this object of my invention by forming the body of mixture not below the filter drum, as is present practice, but above the filter drum so that the lower part of the body of mixture where the heavier particles are situated contacts the filter medium first.

It is another object of this invention to provide a method of forming a cake of material to be filtered on a filter medium which involves the forming of a body of mixture above the filter medium.

It is another object of my invention to provide an apparatus for conducting the method of this invention.

Other objects and advantages will be made evident hereinafter.

Referring to the drawings in which I illustrate my invention,

Fig. 2 is an enlarged fragmentary section taken on the line 2—2 of Fig. 1.

Fig. 3 is a fragmentary plan view taken as indicated by the arrow 3 of Fig. 2.

Figure 1:
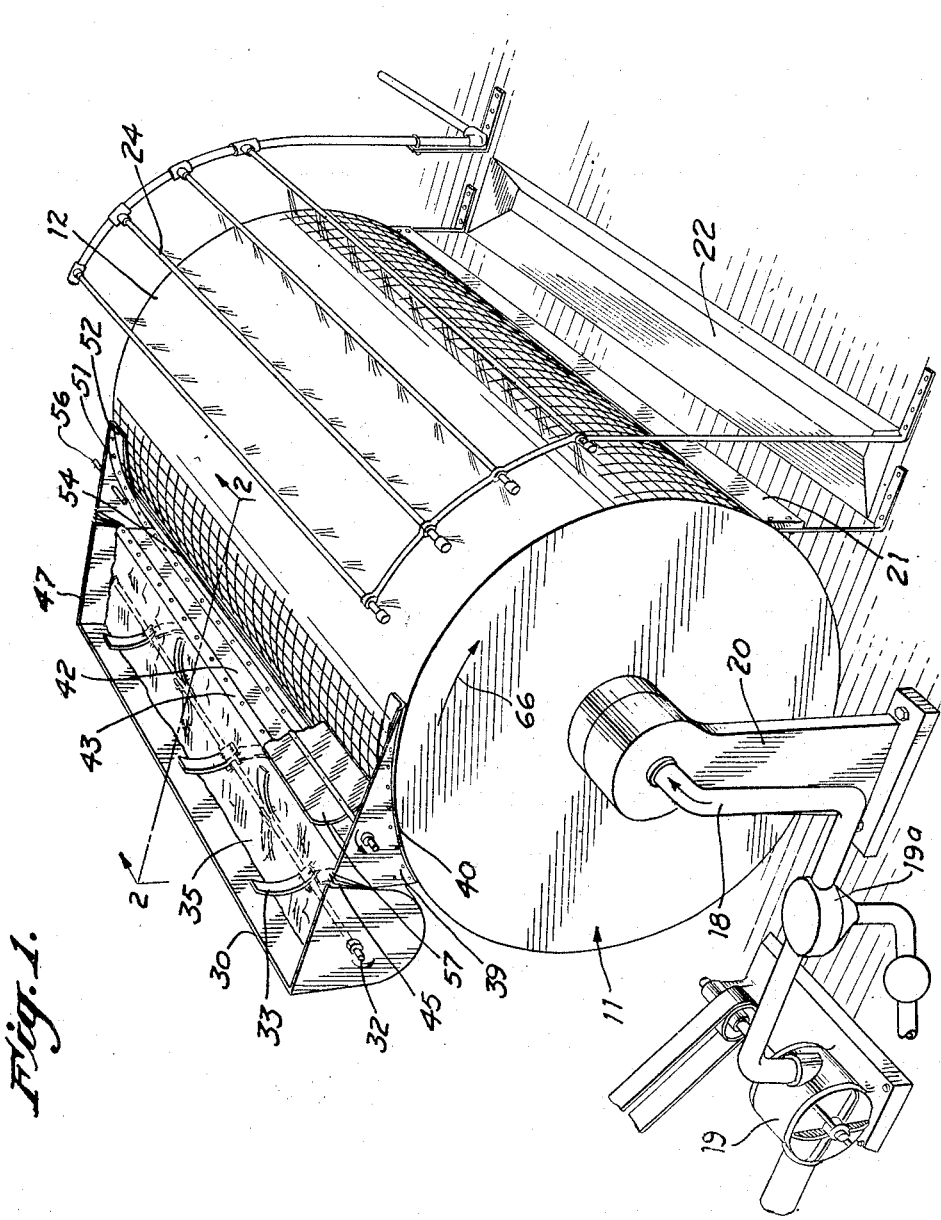
Fig. 1 is a diagrammatic perspective view of a vacuum filter embodying the features of this invention.

In the drawings, 11 represents a rotary filter drum having a cylindrical filter medium 12 which is preferably made from a fabric of fine mesh. Inside the filter medium 12 is a cylindrical wall 13 which provides an annular space 14. The annular space 14 is divided into sections by means of septums 15, each of which sections has vacuum pipes 17 connected thereto. The vacuum pipes 17 are connected to a main vacuum line 18 having a liquid trap 19ª, which pipes are connected to a vacuum pump 19 (Fig. 1), by means of which a vacuum is formed at the inner side of the filter medium 12. The rotary drum 11 is rotatably supported by frames 20 situated at opposite ends thereof, one of which is shown in Fig. 1. Engaging the filter medium 12 is a scraper 21 by means of which a cake formed thereon may be removed therefrom, this cake falling through an opening 22. A solvent spray 24 is provided, as illustrated in Fig. 1, by means of which a fresh solvent may be sprayed on the cake formed on the filter medium 12 as will be described hereinafter.

The important part of the invention is embodied in the structure which will now be described. 30 represents a reservoir tank which is carried by a suitable support 31. Extending longitudinally through the reservoir tank 30 is a shaft 32 to which agitating paddles 33 are secured. The agitating paddles have curved or spiral ends as shown. The shaft 32 is rotated by means of a sprocket 34 (Fig. 3) which may be engaged by a chain, not shown. The numeral 35 represents a mixture of material to be filtered, this mixture being introduced into the reservoir tank 30 through a spout 36. The agitating paddles 33 operate continually in order to agitate the body 35 and to prevent the heavy particles from precipitating to the bottom of the reservoir tank 30. Placed adjacent to the reservoir tank 30 is a distributor 38. The distributor 38 consists of end plates 39, the lower edges 40 of which are arcuated to conform to the shape of the periphery of the filter drum 11. Connecting together the ends of the end plate 39 adjacent to the reservoir tank 30 is a side plate 42. An adjacent overflow wall 43 of the reservoir tank 30 is somewhat lower than the other walls of the reservoir tank 30, and the upper edge of the side plate 42 of the distributor 38 is flexibly secured thereto by means of a leather hinge strip 44, as illustrated best in Fig. 2. Flexible corrugated members 45 are connected to the upper part of the ends 47 of the reservoir tank 30 and to the upper parts of the end plates 39 for filling in a space which exists therebetween so as to prevent leakage. The flexible hinge 44 is the only point of suspension of the distributor 38 and therefore the distributor may adhere closely to the surface of the filter medium 12. It is, therefore, necessary to provide a flexible member 45; since there must be a free movement of the distributor a rigid joint would not do. Connected to the lower parts of the end plates 39 and the side plate 42 of the distributor 38 is a valve strip 49 which may be secured in place by means of rivets 50 which extend through a vertical flange 51 of the valve strip 49. The valve strip 49 may be made of leather or other suitable pliable material. A valve flange 54 of the valve member 49 is adapted to contact the filter medium 12, as illustrated best in Figs. 1 and 2, in order to prevent a leakage of mixture from the interior of the distributor 38 between the end plates 39 and the side plate 42 and the filter medium 12. Extending longitudinally across the distributor 38 is a shaft 56 which supports a circulating paddle 57 which extends substantially the entire length of the distributor. A sprocket 58 is secured to an extending end of the shaft 56 and this sprocket 58 is driven by a sprocket chain 59 which extends over a sprocket 60 secured to the shaft 32 adjacent to the sprocket 34.

The operation of the invention is substantially as follows:

The mixture is introduced into the reservoir tank 30, this mixture consisting of a comminuted substance which has been thoroughly mixed with a solvent or other liquid. The agitating paddles 33 operate to prevent a stratification of the mixture in the reservoir tank 30 and force it in small waves towards the overflow wall or weir 43. As the mixture is introduced into the reservoir tank 30 it will overflow the wall 43 into the distributor 38 and form a body therein. There will be practically no leakage of the mixture from the distributor 38 by reason of the valve strips 49, the valve flanges 54 of which are forced into non-leaking contact with the filter medium by reason of the vacuum thereon and by reason of their inherent tendency to engage the filter medium and by reason of the pressure of the mixture which tends to hold it in non-leaking engagement.

As previously mentioned, the constituents of the mixture may be classified as heavy particles, light particles and colloidal matter. Referring to Fig. 2, the mixture forms into three layers 63, 64 and 65. The layer 63 consists mostly of heavy particles with light particles; the layer 64 consists mostly of light particles with some colloidal matter; and the layer 65 consists almost wholly of colloidal matter. The lower layer 63 is quite porous; the medial layer 64 is less porous; and the top layer 65, since it is almost all colloidal matter, is substantially impervious. The rotary drum 11 is revolved in a direction indicated by the arrow 66 of Fig. 1 and a vacuum is placed in the compartments 14 by means of a vacuum created by the vacuum pump 19. As the drum rotates the filter medium 12 comes into engagement with the mixture at the left and lowest part of the distributor 38 where the heavy particles of the mixture are situated. The porous layer 63 is first to contact the filter medium and a porous coating will adhere thereto. The porous coating is contacted by the less porous layer 64 and coating of less porous material adheres thereto. The colloidal matter of the layer 65 cannot contact with the filter medium but must adhere to the outer face of a coat of heavy and light particles which have been formed thereon before the colloidal matter has an opportunity to contact the filter medium. The cake formed on the filter medium 12, as indicated at 67 in Fig. 2, has a porous base and will not clog the filter medium because the colloidal matter cannot contact it. During this time the circulating paddle 57 is in operation. This circulating paddle is for the purpose of circulating the mixture in the distributor 38, causing the mixture to be thrown in small waves onto the surface of the filter medium. The circulating paddle 57 prevents a collection of any stringy constituents in the distributor or on the overflow wall and prevents any settling of the heavy particles which, without circulation, would tend to form into a firm cake and not readily adhere to the surface of the filter medium. As the drum rotates, the cake 67 is sprayed with solvent by means of the spray 24, this solvent being drawn into the cake by means of the vacuum in the compartments 14. The cake is then removed from the filter medium 12 by the scraper 21.

From the foregoing description it will be seeen that the colloidal matter in the mixture cannot contact the filter medium 12 because the heavy particles of the mixture come into engagement with the filter medium first. By this provision the colloidal matter is almost wholly prevented from clogging the filter medium and therefore a vacuum filter embodying the features of this invention will operate efficiently over a long period of time without a clogging of the filter medium. There is, of course, some of the colloidal matter drawn to the filter medium by means of the vacuum. However, this colloidal matter does not firmly adhere to the filter medium and does not form in a continuous layer which prevents the vacuum from acting upon the mixture. The important part of this invention subsists in a method of applying a coat of mixture to a filter medium in such a manner that the heavy particles thereof contact the filter medium, thus forming a porous base. The apparatus shown in the drawings is very well suited for this use and has been in operation on a rotary filter, used for extracting oil from comminuted cottonseed, for quite a period of time.

My invention is applicable to vacuum filters in general and I do not hereby limit myself to any one particular type of vacuum filter or to its use in treating cottonseed meal.

I claim as my invention:

1. A vacuum filter comprising: a filter medium; means for moving said filter medium; a distributor for retaining a body of mixture above said filter medium, the lower part of said body of mixture contacting said filter medium; a reservoir for said mixture, by means of which said mixture is supplied to said distributor; and means for flexibly connecting said distributor to said reservoir.

2. A vacuum filter comprising: a filter medium; means for moving said filter medium; a distributor for retaining a body of mixture in contact with said filter medium, the lower part of said body of mixture contacting said filter medium before the upper part thereof, said distributor having a pliable valve strip adapted to engage said filter medium to prevent leaking of said mixture from said distributor; and means for supplying said mixture to said distributor.

3. A vacuum filter comprising: a filter medium; means for moving said filter medium; a distributor for retaining a body of mixture above said filter medium, the lower part of said body of mixture contacting said filter medium, said distributor having a pliable valve strip adapted to engage said filter medium to prevent leaking of said mixture from said distributor; a circulating paddle operable in said distributor; and means for supplying said mixture to said distributor.

4. A vacuum filter comprising: a filter medium; means for moving said filter medium; a distributor for retaining a body of mixture in contact with said filter medium, the lower part of said body of mixture contacting said filter medium before the upper part thereof; a reservoir for said mixture, by means of which said mixture is supplied to said distributor; and means for hingedly connecting said distributor to said reservoir.

5. A vacuum filter comprising: a filter medium; means for moving said filter medium; a distributor for retaining a body of mixture in contact with said filter medium, the lower part of said body of mixture contacting said filter medium before the upper part thereof, said distributor having a pliable valve strip adapted to engage said filter medium to prevent leaking of said mixture from said distributor; a circulating paddle operable in said distributor; and means for supplying said mixture to said distributor.

6. In a vacuum filter, the combination of: a filter medium; means for moving said filter medium; a distributor for retaining a body of mixture in contact with said filter medium, the lower part of said body of mixture contacting said filter medium before the upper part thereof; a reservoir having a substantially horizontal weir edge formed on a wall thereof, over which edge mixture is adapted to flow from said reservoir into said distributor; and a plurality of mixing paddles rotatably mounted in said reservoir, said paddles tending when rotated to cause waves of mixture which move towards said edge.

7. In a vacuum filter, the combination of: a filter medium; means for moving said filter medium; a distributor for retaining a body of mixture in contact with said filter medium, the lower part of said body of mixture contacting said filter medium before the upper part thereof; a reservoir having a substantially horizontal weir edge formed on a wall thereof, over which edge mixture is adapted to flow from said reservoir into said distributor substantially throughout the length of said reservoir; and a plurality of mixing paddles rotatably mounted in said reservoir, said paddles tending when rotated to cause waves of mixture which move towards said edge.

8. A vacuum filter comprising: a filter medium; means for moving said filter medium; means for placing a vacuum on said filter medium; a distributor for retaining a body of mixture in contact with said filter medium; and a valve strip secured to said distributor, said valve strip having a pliable valve flange adapted to lie in actual contact with said filter medium, said valve flange being retained in sealing engagement by said vacuum means and by the weight of said body of mixture.

In testimony whereof, I have hereunto set my hand at Los Angeles, California, this 26th day of February, 1926.

ROBERT O. BOYKIN.